(12) United States Patent
Ogilvie

(10) Patent No.: US 9,179,664 B2
(45) Date of Patent: Nov. 10, 2015

(54) KINETIC NON-ADHESIVE PEST CONTROL TOOLS AND TECHNIQUES

(76) Inventor: John Ogilvie, Salt Lake City, UT (US)

( * ) Notice: Subject to any disclaimer, the term of this patent is extended or adjusted under 35 U.S.C. 154(b) by 1046 days.

(21) Appl. No.: 12/849,738

(22) Filed: Aug. 3, 2010

(65) Prior Publication Data

US 2012/0304526 A1    Dec. 6, 2012

Related U.S. Application Data

(60) Provisional application No. 61/235,626, filed on Aug. 20, 2009.

(51) Int. Cl.
*A01M 3/04* (2006.01)
*A01M 3/02* (2006.01)
*A01M 3/00* (2006.01)

(52) U.S. Cl.
CPC .............. *A01M 3/027* (2013.01); *A01M 3/002* (2013.01)

(58) Field of Classification Search
USPC ........ 43/114, 115, 132.1, 133, 136, 137, 124, 43/134
See application file for complete search history.

(56) References Cited

U.S. PATENT DOCUMENTS

| | | | |
|---|---|---|---|
| 3,798,828 A | 3/1974 | Walti et al. | |
| 3,905,146 A | 9/1975 | Ralston | |
| 3,984,937 A | 10/1976 | Hamilton | |
| 4,052,811 A * | 10/1977 | Shuster et al. | 43/136 |
| 4,502,243 A | 3/1985 | Spindler | |
| 4,793,094 A | 12/1988 | Weaver | |
| D338,943 S | 8/1993 | Agostinelli | |
| 6,044,584 A * | 4/2000 | Lynn | 43/136 |
| 6,178,553 B1 | 1/2001 | Bolton | |
| 6,185,862 B1* | 2/2001 | Nelson | 43/136 |
| 6,651,379 B1 | 11/2003 | Nelson | |
| 7,065,919 B1* | 6/2006 | Vierra | 43/136 |
| 7,430,830 B1* | 10/2008 | Rosa | 43/137 |
| 2007/0169402 A1* | 7/2007 | Jacobson | 43/114 |
| 2010/0175307 A1* | 7/2010 | Gotschi | 43/113 |

OTHER PUBLICATIONS

Rayelan, "Is anyone seeing tiny insects crawling on their computer screens?", Retrieved at <<http://www.rumormillnews.com/cgi-bin/archive.cgi?read=147573>>, May 27, 2009, pp. 4.
"Yellow post-it notes as attracters for fungus gnats?", Retrieved at <<http://answers.yahoo.com/question/index?qid=20070210212100AALnKEg>>, 2006, pp. 3.
Charlie Hatton, "Justice May Be Blind, But It Can Still Get the Willies", Retrieved at <<http://www.wherethehellwasi.com/categories/the-happy-homeowner/justice_may_be_blind_but_it_ca.html>>, Jul. 8, 2003, pp. 7.
Pierce et al., "Direct Measurement of Punch Force During Six Professional Boxing Matches [Abstract]", Retrieved at <<http://www.bepress.com/jqas/vol2/iss2/3/>>, 2006, pp. 2.

(Continued)

*Primary Examiner* — Lisa Tsang
(74) *Attorney, Agent, or Firm* — Ogilvie Law Firm

(57) ABSTRACT

A note pad is attached to a device having a handle and a base. Kinetic force is applied through the device to stun or crush a target pest between a top sheet of the note pad and a wall or floor. The top sheet does not have previously applied adhesive for trapping insects, and hence does not generally adhere to the wall or floor. The note pad top sheet can be removed, wrapped around the target's remains, and placed in a wastebasket for disposal.

10 Claims, 6 Drawing Sheets

(56) References Cited

OTHER PUBLICATIONS

Walilko et al., "Biomechanics of the head for Olympic boxer punches to the face", Retrieved at <<http://bjsm.bmj.com/content/39/10/710.abstract>>, 2005, pp. 2.

Julian Edgar, "Making Things, Part 6", Retrieved at <<http://autospeed.com.au/cms/A_4003/printArticle.html>>, copyright 1996-2010, pp. 5.

"Compressive strength", Retrieved at <<http://en.wikipedia.org/wiki/Compressive_strength>>, no later than Jul. 24, 2010, pp. 4.

"91 F. 3d 171—*Minnesota Mining and Manufacturing Co v. United States International Trade . . .*", Retrieved at <<http://openjurist.org/91/f3d/171/minnesota-mining-and-manufacturing-co-v-united-states-international-trade-commission>>, Jun. 17, 1996, pp. 3.

Don Stackhouse, "Now, regarding spar design . . . ", <<Retrieved at http://www.rcgroups.com/forums/showthread.php?t=613556&page=24&pp=62>>, Dec. 15, 2007, pp. 31.

\* cited by examiner

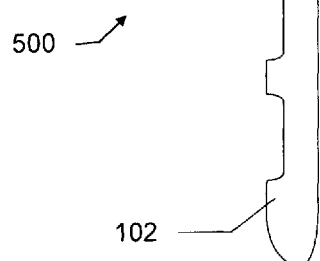
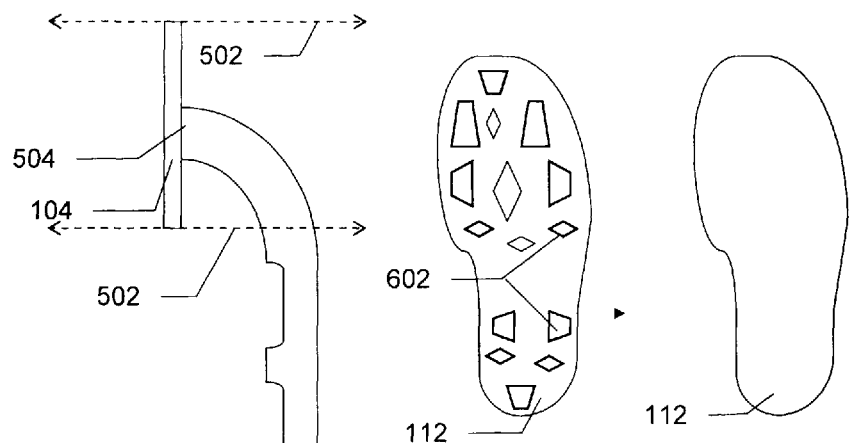
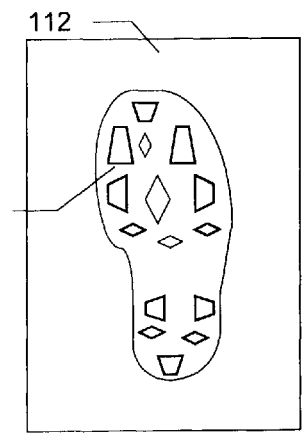
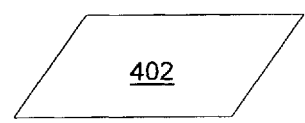
Fig. 5
Fig. 6
Fig. 7
Fig. 4
Fig. 8

KINETIC NON-ADHESIVE PEST CONTROL TOOLS AND TECHNIQUES

RELATED APPLICATIONS

The present application claims priority to, and incorporates, U.S. Provisional Patent Application Ser. No. 61/235,626 filed Aug. 20, 2009.

BACKGROUND

Spiders, ants, wasps, and various insects are sometimes found in human living spaces. Various tools and techniques have been used to discourage their undesired presence and to stun or kill them to facilitate their removal, with mixed results. Pesticides and other chemical agents can be very effective, but may persist beyond the pests they are used against, sometimes with undesirable side effects. Traps may be ignored or avoided. Fly paper and other sticky surfaces can be effective traps, but may also be unsightly if one waits for multiple kills before disposing of them, and expensive if one disposes of them after each kill. Spiders and insects can be simply smashed against a wall or floor with a swatter, a shoe, a book, or another household object, but often some remains of the smashed pest are then left behind, smeared on the object that was used to kill the pest.

SUMMARY

Some embodiments include a device for smashing spiders and insects, including a base having a stack attachment area, and a handle secured to the base. A stack of disposable sheets is attached to the base stack attachment area. The handle and base together have a compressive strength and stiffness adequate to withstand impact as a user grips the handle and slaps or swats the stack of sheets against a target creature, so that the device does not permanently change shape by bending or breaking on impact. A Post-It® brand note pad or a Beautone® brand note pad may serve as the stack of sheets, for example. (Post-It® is a mark of 3M Company Corporation, Beautone® is a mark of Yuen Foong Paper Co. Ltd.) The stack of sheets is attached (mechanically and/or by adhesive) to the base stack attachment area. For instance, the stack of sheets may be attached by a medium-to-high adhesion range adhesive surface secured to the base stack attachment area, to prevent the sheet stack from coming loose after repeated impacts. Alternately, a low adhesion adhesive may be used to hold the stack of sheets on the device base. The sheets in the stack are attached to one another by low adhesion adhesive, making it easy to remove a sheet after impact, together with any insect remains on the sheet which adhered naturally.

Some embodiments are used as follows. A user obtains a device which has a handle and a base with a stack attachment area. If a stack of sheets, such as a stationary notepad, is not already attached to the stack attachment area, then the user attaches the sheet stack to the stack attachment area, e.g., by adhesive and/or a clamp. The user grips the device handle, and tracks a target creature as it moves on or near a wall, floor, or other opposing surface. When the user is ready and the target's position appears vulnerable, the user utilizes the device kinetically to apply pressure to a top disposable sheet of the sheet stack in order to press the top disposable sheet against the target creature, thereby stunning, disabling, or killing the target creature by crushing it between the top sheet and the opposing surface. The user then removes the top disposable sheet from the sheet stack, wraps the sheet around the target's remains, and disposes of the sheet and the remains. If the user misses the target, the sheet stack will not stick to the wall or floor, leaving it instead in the same condition it was in before the impact, because the portion of the sheet that impacts pests and their surrounding surfaces is largely or entirely free of artificial human-applied adhesive (residual low bond adhesive from a previously removed sheet may be present). After the last sheet of a stack is used, the user reloads the device by attaching a new sheet stack to the stack attachment area. The new stack may be attached directly to the stack attachment area, or it may be attached to a back sheet of the previous sheet stack which is in turn attached (possibly through additional back sheets and/or reload sheets) to the base stack attachment area.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 4 is a perspective view of a reload sheet for use in or with some embodiments;

FIG. 5 is a side view of an alternate device embodiment in the general form of a hammer, illustrating a handle, a base, and a sheet stack;

FIG. 6 is a bottom view illustrating a custom sheet stack with the shape and printed indicia of a boot sole;

FIG. 7 is a bottom view illustrating a custom sheet stack with the shape of a boot sole and no printed indicia;

FIG. 8 is a bottom view illustrating a custom sheet stack with the shape of a standard note pad stack and with printed indicia of a boot sole;

DETAILED DESCRIPTION

Overview

Figure 1:
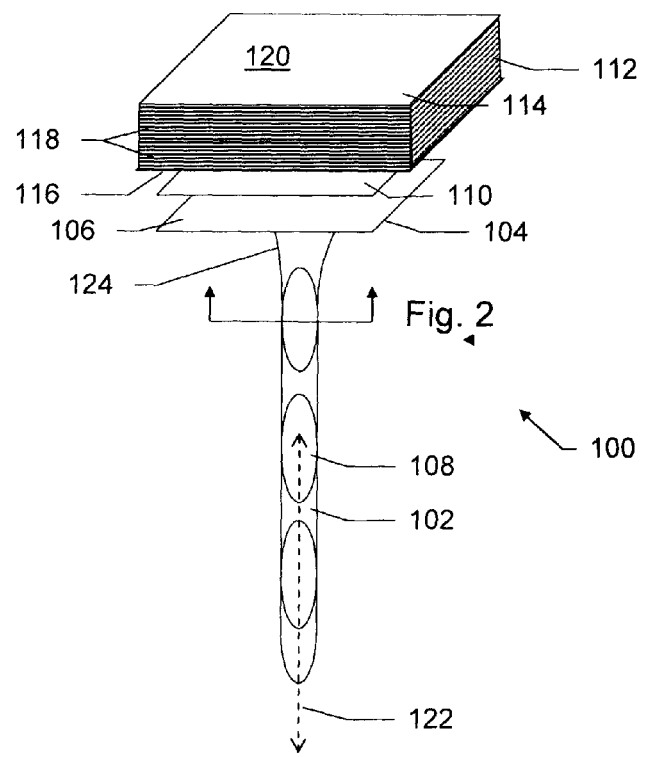
FIG. 1 is an exploded perspective view of one device embodiment in the general form of a stamp, illustrating a handle, a base, an adhesive surface, and a sheet stack.

Embodiments described here provide an effective and inexpensive way to stun or kill spiders, ants, wasps, and other undesired insects and pests. In some embodiments, a stationary pad, such as a Post-It® brand note pad or a Beautone® brand note pad, is attached to a suitable handle and used as a set of disposable sheets for smashing pests. After a target insect is smashed by kinetic forces between the top sheet of the note pad and a floor or wall, the top sheet is removed and disposed of in a wastebasket. Some pest remains may adhere to the top sheet, due to their natural properties, but an artificial adhesive is not used to stick the pest to the sheet.

Unlike the use of a shoe or a book to smash the insect, use of the present device does not leave one with a household item whose primary use and positive connotations have been compromised by (a) being associated in the user's memory with the smashing of an insect, and (b) possibly still carrying some remains of a smashed pest.

Unlike devices that require specialized adhesive sheets to trap pests, the present device can be "reloaded" with sheets (stationary notepads) that are widely available in office supply stores, and many grocery stores. Moreover, because their target contact surface lacks artificial or human-applied adhesives prior to impact, the present device's sheets pose no risk of accidentally adhering to the user's fingers, clothing, furniture, carpet, or other household items.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises the right to his own lexicography. Terms may be defined, either explicitly or implicitly, here in the Detailed Description and/or elsewhere in the application file.

The terms "sheet stack" and "stack of sheets" are used interchangeably herein. A stack of sheets, and a sheet stack, generally contains multiple sheets but may also contain only a single sheet after other sheets previously in the stack have been removed.

"Low bond adhesive" means an adhesive of the kind used in stationary pads, note pads, and the like. For example, Post-It® brand paper products use a low bond adhesive. Some low bond adhesives are discussed, for instance, in U.S. Pat. No. 4,166,152 assigned to 3M Company Corporation, but other low bond adhesives exist, such as those used certain Beautone® brand products; see, e.g., 91 F3d 171, Minnesota Mining and Manufacturing Co v. United States International Trade Commission. Low bond adhesives are sometimes referred to as "repositionable" adhesives.

"Medium-to-high adhesion" means adhesion stronger than the adhesion of low bond adhesives. For example, duct tape, many double-sided tapes, epoxy, and other adhesives which are intended to create a long-lasting or permanent bond provide medium-to-high adhesion.

"Cross" means two generally longitudinal shapes oriented across one another. Some of the many possible examples include a cross like those employed in Christian iconography, an Iron Cross, and crossed bones in a skull-and-cross-bones arrangement.

"Gun" includes handguns, long guns such as rifles or shotguns, cannons, spear guns, and other projectile-firing weapons.

"Sword" includes long swords, epees, daggers, broad swords, Japanese swords, throwing stars, pikes, lances, and other edged weapons.

"Glove" includes boxing gloves, pillows having a recess shaped to receive a hand or fist, gauntlets, and other devices which partially or fully cover a user's hand or fist and provide it with resilient and/or padded protection against impact.

Throughout this document, use of the optional plural "(s)" means that one or more of the indicated feature is present. For example, "sheet(s)" means "one or more sheets" or equivalently "at least one sheet".

Devices

Referring now to FIG. 1, some embodiments provide a pest control device in the general form of a stamp, namely, a device such as device 100 which has a longitudinal handle 102 and a base 104 secured to the handle. The base has a stack attachment area 106.

The device 100, like many other embodiments, may be formed of molded plastic, wood, metal, rubber, and/or other materials.

The illustrated device 100 has grips 108, formed with indentations in the generally cylindrical handle. Rubber or another slip-resistant material may be present in the grips and/or elsewhere along the handle.

An adhesive surface 110 is shown above the stack attachment area, but in use the adhesive surface is attached to the stack attachment area on one side and to a sheet stack 112 on the other side. The adhesive surface may be formed of double-sided tape with a medium-to-high adhesion, for example.

A sheet stack 112 may be a note pad or other stationary pad, such as a Post-It® brand note pad or a Beautone® brand note pad, for instance. The illustrated sheet stack has a current top sheet 114 and a back sheet 116 which is not ordinarily used for note taking; however, some stacks 112 lack a back sheet. In the sheet stack 112, only a low bond adhesive is present, which is designed to releasably hold together individual sheets 118 of the stack 112. Each sheet 118 has a note area 120 which is free of adhesive, and is designed to receive and retain ink when people use the stack for its original intended purpose as a pad of note paper, index tabs, and so on.

Figure 2:
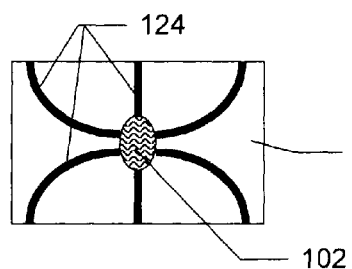
FIG. 2 is a view of the device shown in FIG. 1, along a handle center axis, further illustrating structural ribs of the base and handle.

FIG. 2 is a view of the device 100 along a handle center axis 122, further illustrating structural ribs 124 of the base and handle. These ribs help prevent the device from breaking when it is used to crush insects between the top sheet 114 and a wall, floor, countertop, shelf, appliance exterior, or other opposing surface.

Figure 3:
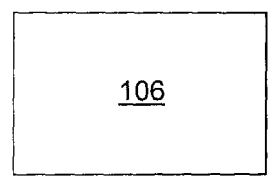
FIG. 3 is a view along the same axis as FIG. 2, in the opposite direction, further illustrating a stack attachment area of the base.

FIG. 3 is a view of the stack attachment area 106 along the same axis 122, but in the opposite direction from FIG. 2. In FIG. 3 the stack 112 and the adhesive surface 110 are omitted from the illustration.

In some embodiments, the stack attachment area 106 is a flat rectangular surface, as shown in FIG. 3. In other embodiments, the stack attachment area has a perimeter in other shapes, including for example, other polygons or iconic shapes such as a fist outline, a cherry bomb outline, a stop sign outline, and so on. Also, the illustrated stack attachment area is mathematically a convex set, but other embodiments are non-convex sets, e.g., a cherry bomb outline defines an area that is a non-convex set of points. Likewise, a raised edge or lip, a set of ridges, and a set of concentric rings each define a stack attachment area that is a non-convex set of points. Note also that the illustrated stack attachment area 106 is flat (planar) but some other stack attachment areas are not planar. For instance, a stack attachment area may be curved like the intersection of a solid cube with a hollow cylinder; this allows a user to roll over a target, like the partial rotation of a steam roller drum. It will be understood that the degree and complexity of curvature or bumpiness or other departure of the stack attachment area from a planar convex set is limited by the goal of attaching a sheet stack to the stack attachment area. For instance, candidate stack attachment areas that are too sharply curved or too sparsely in contact with a back sheet will not stay in attachment with a sheet stack.

FIG. 4 is a perspective view of a reload sheet 402 for use in or with some embodiments. The reload sheet is a precut piece of double-sided tape, of medium-to-high adhesion. After the protective covers are removed to expose the adhesive, the reload sheet is placed between a replacement sheet stack and the stack attachment area, to attach the replacement sheet stack to the device base. The reload sheet may be attached directly to the stack attachment area, or the reload sheet may attach to one or more back sheets that are attached to one another, and through the back sheets be attached to the stack attachment area.

FIG. 5 is a side view of an alternate device 500 which has the general form of a hammer. Like the stamp device 100, the hammer device 500 has a handle 102 and a base 104 with a stack attachment area. Unlike device 100, the handle of device 500 is not fully in line behind the base. The handle of device 100 is fully contained within a hull volume that is defined mathematically by all normals to the stack attachment area of device 100. By contrast, a portion of the handle of device 500 extends beyond the edges of that device's stack attachment area hull volume (the hull volume indicated in FIG. 5 by dashed lines 502).

The handle of device 100 is substantially normal to that device's stack attachment area. The handle of a stamp device could also be tilted relative to the device's stack attachment area but nonetheless remain inside the device's base stack attachment area hull volume. The hammer device 500 handle includes a longitudinal portion, beginning at point 504, which is oriented at an angle (indeed, multiple angles along a curve) that is not normal to the base stack attachment area but instead follows a curve and then travels perpendicular to the normals.

Other hammer embodiments also have handles 102 that are both outside the stack attachment area hull volume and not normal to the base stack attachment area 106. From the side, some of these embodiments look like a claw hammer, a mallet, a mace, or an axe, for example, with a stack attachment area (and in operation, with a sheet stack attached to the stack attachment area).

FIGS. 6 through 8 illustrate custom sheet stacks, using a boot customization as an example. The custom sheet stack shown in FIG. 6 has both a custom shape (a boot sole outline) and a custom printed indicia 602 (a boot sole tread print). The custom sheet stack of FIG. 7 has the shape of a boot sole but no printed indicia, while the FIG. 8 custom sheet stack has the shape of a standard rectangular stack 112 with printed indicia of a boot sole. Other embodiments use one or more other custom shapes and/or custom printed indicia, such as for example a fist, grenade, bomb with fuse, skull, hammer, sword, gun, missile, carnivorous creature, tornado, lightning, cross, corporate logo, organizational logo, or logo denoting membership in a particular group.

Figure 9:
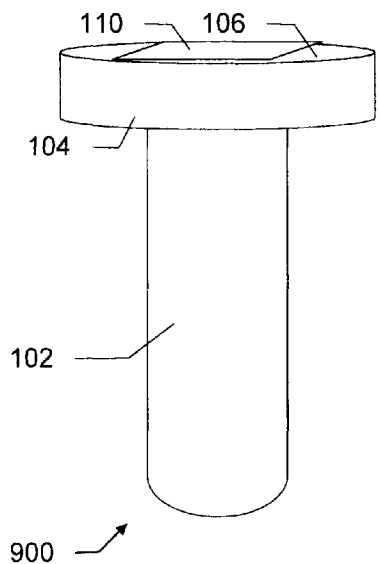
FIG. 9 is a perspective view of an alternate device embodiment in the general form of a stamp, illustrating a handle with no openings, a base which is larger than a selected sheet stack, and an adhesive surface the size of the selected sheet stack.

FIG. 9 is a perspective view of an alternate device 900 in the general form of a stamp. Although device 100 and device 900 are both stamp devices, device 900 differs in several respects from device 100. For example, device 900 has an oversized stack attachment area 106 which is larger than the sheet stack 112 footprint, and which is also a different shape than the sheet stack and the adhesive surface 110. In either device 100 or device 900, however, a reload sheet 402 could be a different shape than the sheet stack and/or a different shape than the stack attachment area.

Figure 10:
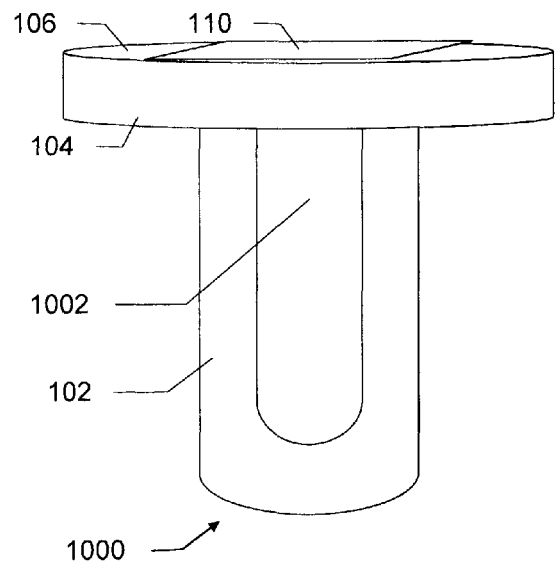
FIG. 10 is a perspective view of an alternate device embodiment in the general form of a stamp, illustrating a handle with a finger opening, a base which is larger than a selected sheet stack, and an adhesive surface the size of the selected sheet stack.

FIG. 10 is a perspective view of an alternate stamp device 1000 which is largely consistent with stamp device 900. However, the handle of device 1000 has a finger opening 1002 for receiving a user's fingers.

Figure 11:
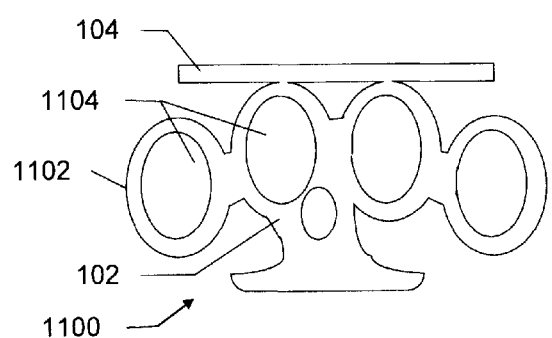
FIG. 11 is a side view of an alternate device embodiment in the general form of a knuckle duster, illustrating a handle with four finger rings and a base.

FIG. 11 is a side view of an alternate device 1100 in the general form of a knuckle duster, in which the handle 102 has four finger rings 1102 with finger openings 1104. Knuckle dusters are sometimes called "brass knuckles". In the present context, the device 1100 may indeed be made with brass, but other materials such as plastic, resilient plastic foam, open-cell foam, Styrofoam, and rubber may also be used, as noted above. A variation on the knuckle duster includes a solitary finger ring 1102 secured to a base 104, and is worn by the user as a ring, typically with the base on the side of the user's hand opposite the user's palm. Since the user may punch a target pest to crush it between a sheet stack attached to the device 1100 base 104 and an opposing surface, some embodiments include rubber, foam, or another cushion and/or resilient material on the finger ring(s) 1102 to help protect the user's hand from overly enthusiastic punching. Foam or another spring mechanism may also be placed between the base 104 and the handle 102 of a device, to absorb excess pressure, thereby helping protect both the user and the opposing surface. In one variation, the entire knuckle duster portion of the device 1100 is made of foam and/or other cushioning/resilient material(s).

Figure 12:
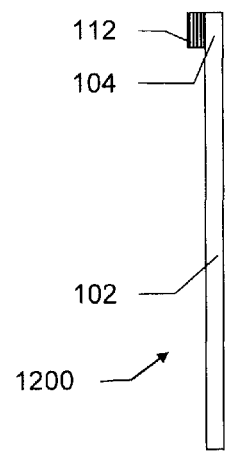
FIG. 12 is a side view of an alternate device embodiment in the general form of a swatter, illustrating a handle with a base portion, and an attached sheet stack.

FIG. 12 is a side view of an alternate device 1200 in the general form of a swatter. The handle 102 has a base 104 portion, and is shown with an attached sheet stack 112.

Figure 13:
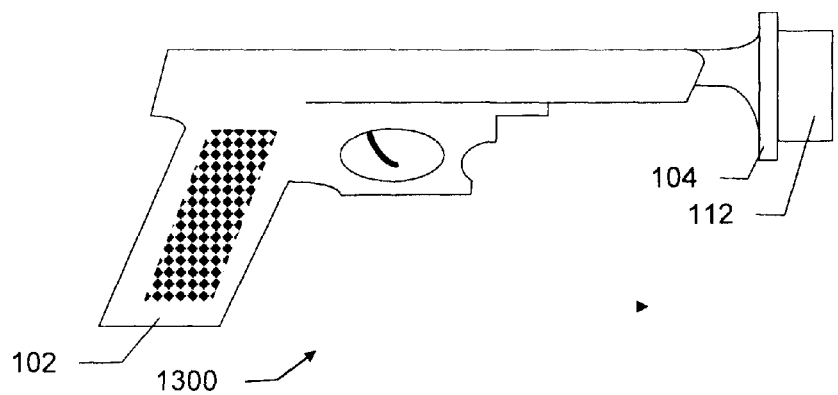
FIG. 13 is a side view of an alternate device embodiment in the general form of a handgun, illustrating a handle, a base permanently secured to the handle, and a sheet stack.

FIG. 13 is a side view of an alternate device 1300 in the general form of a handgun. In device 1300 and similar embodiments, the gun-shaped portion is not mechanically capable of accepting a bullet or of firing a bullet or any other projectile. Indeed, a barrel opening may be omitted. The gun-shaped portion of the device (including a grip, trigger guard, trigger, slide, barrel, etc.) forms the device handle 102.

A semi-automatic shaped handle is shown, but other gun embodiments include handles in other gun shapes, such as revolvers, rifles, shotguns, muskets, and so on. In the device 1300 and similar devices, the base 104 is permanently secured to the handle. For instance, the handle and base may be formed from a single piece of plastic, so the handle and base are integral. Alternately, extension(s) from the base may be mechanically clipped or snapped into corresponding receiving slot(s) or other opening(s) in the handle, so the removal of the base is difficult or impossible without breaking off the extension(s).

Figure 14:
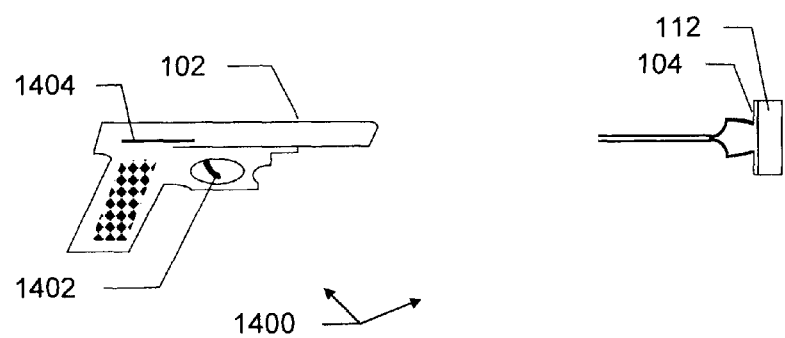
FIG. 14 is a side view of an alternate device embodiment in the general form of a handgun, illustrating a handle, a projectile base which can be releasably secured to the handle, and a sheet stack.

FIG. 14 is a side view of an alternate device 1400, also in the general form of a handgun, but mechanically capable of accepting and then firing a projectile base 104. That is, the base 104 can be releasably secured to the handle 102. The base is released from the handle and fired by a compressed gas or spring, for example, sending a sheet stack on the base toward a target. That is, pulling a trigger 1402 in device 1400 and in similar embodiments (e.g., those in the shape of other guns) actuates a mechanism 1404 in the handle 102, propelling the base 104 and its attached sheet stack 112 away from the handle. Mechanism 1404 may include a compressed gas release mechanism like those used in air pistols, a compressed spring mechanism like those used in guns that fire rubber-suction-cup-headed darts, a compressed elastic mechanism like that used in a surgical-tube slingshot, or another mechanism. Use of gunpowder as a propellant is possible but discouraged because the power required to crush the target pest without damaging the opposing surface would (it is believed) be substantially less than the power likely to be produced using gunpowder. As with device 1300, a semi-automatic shaped handle is shown for device 1400, but other gun embodiments include handles in other gun shapes, such as revolvers, rifles, shotguns, rayguns, and so on.

Figure 15:
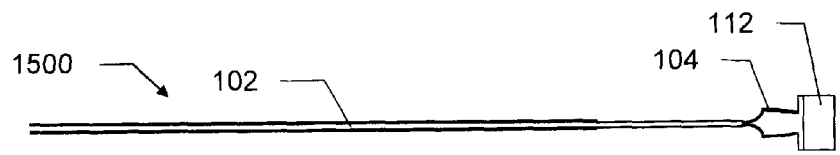
FIG. 15 is a side view of an alternate device embodiment in the general form of a spear, illustrating a handle, a base, and a sheet stack.

FIG. 15 is a side view of an alternate device 1500 in the general form of a spear. Alternate embodiments include grips on the handle 102 and/or a loop on the end of the handle similar to a loop on a ski pole.

Figure 16:
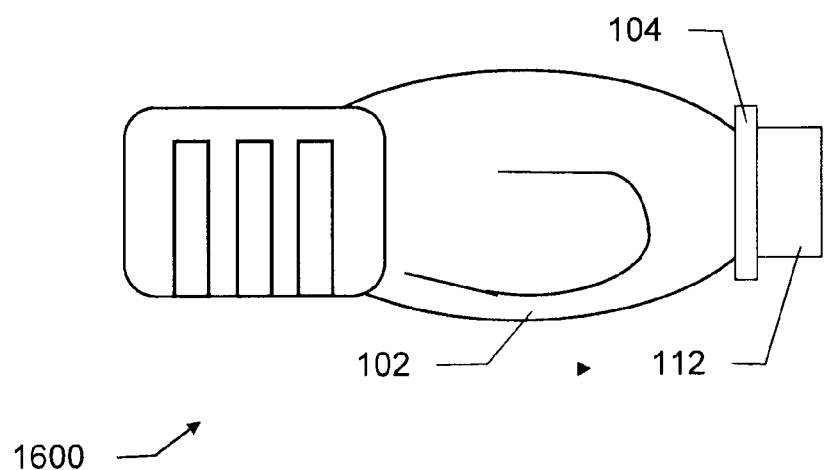
FIG. 16 is a side view of an alternate device embodiment in the general form of a boxing glove, illustrating a handle, a base, and a sheet stack.

FIG. 16 is a side view of an alternate device 1600 in the general form of a Glove, such as a boxing glove. The handle 102 has a base 104 portion, and is shown with an attached sheet stack 112.

The foregoing embodiments are merely some of the many possible devices. In some embodiments, the base is planar, while in others it is arcuate with a concavity facing toward the user, and in still others it is arcuate with a concavity opening away from the user. One embodiment includes a curved rectangular base stack attachment area designed for steamroller-like "rolling fist" use with a stack of Post-It® brand paper strips approximately 1.5 by 5.0 centimeters in size, or a similar note pad.

In a given stamp device embodiment, the handle may include a single-piece shaft, or a multi-piece shaft which performs a plunging action. In a variation, a two-piece shaft with angled channels and tabs fitting therein performs a plunging and rotating action, both smashing and grinding a target pest.

In some embodiments, no reload sheets are needed. A user simply peels off the back sheet of a note pad sheet stack and attaches the pad onto the base stack attachment area using the low bond adhesive of the exposed bottom sheet of the stack 112.

Many of the features that can be mixed and matched to create different embodiments are discussed above. These and other embodiment features can also be categorized. For example, sheet stack 112 shape is one category; shapes may include a boot sole, other boot shapes such as a boot seen from the side, a fist, a shape with an angle for fitting the sheet stack into corners when smashing pests, round shapes, and others.

Adhesive placement is also a feature category. Sheets of a stack 112 may have a low bond adhesive along one edge, on alternating edges of successive sheets, or on a sheet center away from all edge(s), for example.

Sheet 118 material is another feature category. Sheets may be made of thick paper or thin paper as in stationary notes, or they may be made of paper towel, or a cloth-like material like that used in dryer anti-static sheets or disposable floor cleaning cloths. However, sheets should be made of a material, and stacked with adhesive, such that a top sheet pressed against a wall or floor does not adhere to that opposing surface.

Another feature category is printed indicia on stack 112 sheets, such as boot tracks, bullseye targets, cross-hairs, and so on.

Another device feature category is the handle configuration. Handles 102 may include a shaft, a shaft with a base extending beyond the shaft (e.g., as in FIGS. 9 and 10), a J-shaped handle (e.g., FIG. 5), a U-shaped handle, a swatter handle (e.g., FIG. 12), a weapon-shaped handle (e.g., FIGS. 11 and 13-15), or a handle that is worn (e.g., FIG. 16).

Another feature category is the rigidity of the base, e.g., whether it is made with rigid plastic or semi-rigid hard rubber.

Stack attachment area shape is another category, discussed above.

Another category is lethality. Some embodiments include a clear plastic cup through which the handle shaft plunges, allowing a user the option to either trap then smash the pest or to trap then slide a cup cover on and release the pest outside without smashing it.

Some embodiments include a handle with a shaft for hand grip and a base at the shaft end to apply pressure to a stack of sheets (e.g. a Post-It® brand or a Beautone® brand note pad), and a pre-applied-to-base double-sided strong adhesive (vs. stack low bond adhesive) to adhere a first stack of sheets to the handle base.

Some embodiments include "reload anchors" a.k.a. reload sheets 402, in the form of pieces of double-sided tape precut to the area dimensions of commercial stacks 112 of sheets. These allow a user to apply a next stack 112 over a last back sheet of a previous stack adhered to the base, after all sheets on the previous stack have been used up smashing bugs.

Some embodiments have zero moving parts in the device itself, unless one counts removal of a used sheet 118 as moving a part.

Some embodiments provide a device for smashing spiders and insects, including a base 104 having a stack attachment area 106. A handle 102 is secured to the base. The handle and base together have a compressive strength and stiffness adequate to withstand a specified impact force against the base stack attachment area without the device permanently changing shape. The force to be withstood depends on the embodiment, and some example force values include any positive integer multiple of 5 Newtons, from 5 Newtons up to and including 800 Newtons. These values are suggested test values. Devices may withstand any specified compressive force in the range from 1 Newton up to and including 800 Newtons without undergoing plastic deformation. An adhesive surface 110 is secured to the base stack attachment area, capable of adhering to a bottom sheet of a stack 112 of disposable sheets.

For instance, in one such device the handle and base together are adequate to withstand an impact force of 20 Newtons against the base stack attachment area without the device permanently changing shape. In another, the handle and base together are adequate to withstand an impact force of 200 Newtons against the base stack attachment area without the device permanently changing shape. In one embodiment, the handle and the base stack attachment area are portions of a single integral piece of plastic.

In some embodiments, the handle and base are connected by structural ribs 124, thereby reinforcing the base stack attachment area against deformation. The ribs may be formed of plastic or other materials noted herein, and may be integral with the handle, with the base, or with both.

Some embodiments include a sheet stack; others are sold without the sheet stack 112, which is purchased separately by the user. A sheet stack 112 provided commercially often includes a back sheet.

In some embodiments, a sheet stack 112 includes a plurality of disposable sheets 118. Each disposable sheet is adhered to another disposable sheet of the stack with a low-bond adhesive on a portion of those disposable sheets; the sheets 118 are otherwise free of adhesive that would interfere with their original intended use as note pads. The lowest one of the disposable sheets is adhered to a top side of the back sheet with the low-bond adhesive. A bottom side of the back sheet is attached to the base stack attachment area 106 by the medium-to-high adhesion range adhesive surface 110.

In some embodiments, sheet stack 112 is a note pad sheet stack including a plurality of disposable paper sheets 118 which are adhered to one another by low-bond adhesive and otherwise free of adhesive. A bottom sheet 118 of the stack is adhered directly to the base stack attachment area 106.

In some embodiments, such as those illustrated in FIGS. 1, 9, 10, and 15, the handle 102 is fully contained within a hull volume defined by all normals to the base stack attachment area 106. This is not the case with the devices shown in FIGS. 5, 11, 12, 13, 14, and 16 because those handles extend beyond the respective base stack attachment area hull volumes.

In some embodiments, such as those illustrated in FIGS. 5, 12, 13, and 14, the handle 102 includes a longitudinal portion oriented at an angle which is not normal to the base stack attachment area. This condition is not present in the devices shown in FIGS. 1, 9, and 15, because the longitudinal portions of those handles are normal to the respective base stack attachment areas. This condition is also not present in the device shown in FIG. 10 because the portion of the handle (near the 1000 callout arrow tip) that is not normal to the stack attachment area is also non-longitudinal—it is not a longest generally cylindrical part of the handle; that distinction belongs to the two long sides of the handle that define the sides of the opening 1002. This condition is not present in the devices shown in FIGS. 11 and 16 because the glove and the knuckle duster handle each lack a clear longitudinal portion; the knuckle duster finger rings dominate the handle in size, and they are not generally cylindrical.

In some embodiments, such as the knuckle duster device shown in FIG. 11, the handle includes at least one finger ring 1102. The FIG. 11 device includes four finger rings, but other embodiments include only one finger ring, two finger rings, or three finger rings. Some include side-by-side finger rings in pairs (two, four, six, or eight rings total, depending on the embodiments) or in triplets (three, six, nine, or twelve rings total). For claim 1nterpretation purposes, a device that has M rings satisfies a claim requirement that a device comprise N ring(s) if M is greater than or equal to N.

Some embodiments provide a device for smashing spiders and insects, including a base 104 having a stack attachment area 106; a handle 102 secured to the base; and an adhesive surface 104 secured to the base stack attachment area. In some, the adhesive surface has an adhesion strength in a medium-to-high adhesion range. Some embodiments further include a note pad sheet stack 112 including a back sheet 116 adhered to one of a plurality of disposable paper sheets 118 which are adhered to one another by low-bond adhesive and otherwise free of adhesive. A bottom side of the back sheet is attached to the base stack attachment area by the medium-to-high adhesion range adhesive surface.

In some embodiments, the sheet stack 112 includes disposable paper sheets 118 having at least one of the following sheet perimeter shapes: boot, fist, grenade, bomb with fuse, skull, hammer, sword, gun, missile, carnivorous creature, tornado, lightning, cross. FIGS. 6 and 7 illustrate one possible boot perimeter shape. It will be appreciated that some users will favor perimeter shapes like those listed here or others that evoke strength, victory, power, security, and/or skill.

In some embodiments, the sheet stack 112 includes disposable paper sheets imprinted with at least one of the following images: boot, fist, grenade, bomb with fuse, skull, hammer, sword, gun, missile, carnivorous creature, tornado, lightning, cross, corporate logo, organizational logo, logo denoting membership in a particular group. FIGS. 6 and 8 illustrate one possible boot image. It will be appreciated that some users will favor images (printed indicia) like those listed here or others that evoke strength, victory, power, security, and/or skill.

In some embodiments, the sheet stack 112 includes disposable paper sheets 118 in a Post-It® brand note pad or an equivalent (for pest control use) such as a Beautone® brand adhesive note pad. Sheet stack 112 note pads are sometimes referred to commercially as pads of "flags", "index flags", "stickies", "sticky write-on notes", "repositionable notes", or by other terms. Note pads of various sizes may be used in different configurations, including for example 1.5 by 5.0 centimeter strips (sometimes called "page markers"), 4.5 by 1.2 centimeter notes, 3.8 by 5.1 centimeter notes, 7.6 by 7.6 centimeter notes, and other sizes.

In some embodiments, the device includes at least one reload sheet 402, which may be already attached to the device or merely supplied with the device for a user to attach. The reload sheet 402 has a size and shape to permit attachment of the reload sheet to the base stack attachment area 106 without the reload sheet perimeter extending too far beyond the base stack attachment area. For instance, the reload sheet may have the same dimensions as the sheet stack 112, plus or minus a tolerance, or the same dimensions as the stack attachment area 106, plus or minus a tolerance. The tolerance may be relative, e.g., two percent or another percentage under ten percent, of the edge-to-edge distance. Or the tolerance may be an absolute tolerance, e.g., one millimeter or another value under two centimeters. In some embodiments, for example, a reload sheet is capable of a placement secured to the sheet stack and the stack attachment area that satisfies one or more conditions such as the following: no edge-to-edge distance of the reload sheet is more than (or less than) a specified percent of a corresponding edge-to-edge distance of the stack attachment area or the sheet stack; no edge-to-edge distance of the reload sheet is more than (or less than) a specified distance greater than (or less than) a corresponding edge-to-edge distance of the stack attachment area or the sheet stack.

In embodiments like those shown in FIGS. 9 and 10, for example, the stack attachment area is sufficiently larger than the sheet stack to allow the reload sheet to be larger than the sheet stack without having the reload sheet dangle over the edge of the attachment area.

Examples given within this document do not describe all possible embodiments. Embodiments are not limited to the specific implementations, arrangements, indicia, features, approaches, or scenarios provided herein. A given embodiment may include additional and/or different features, for instance, and may otherwise depart from the examples provided herein.

Methods

Figure 17:
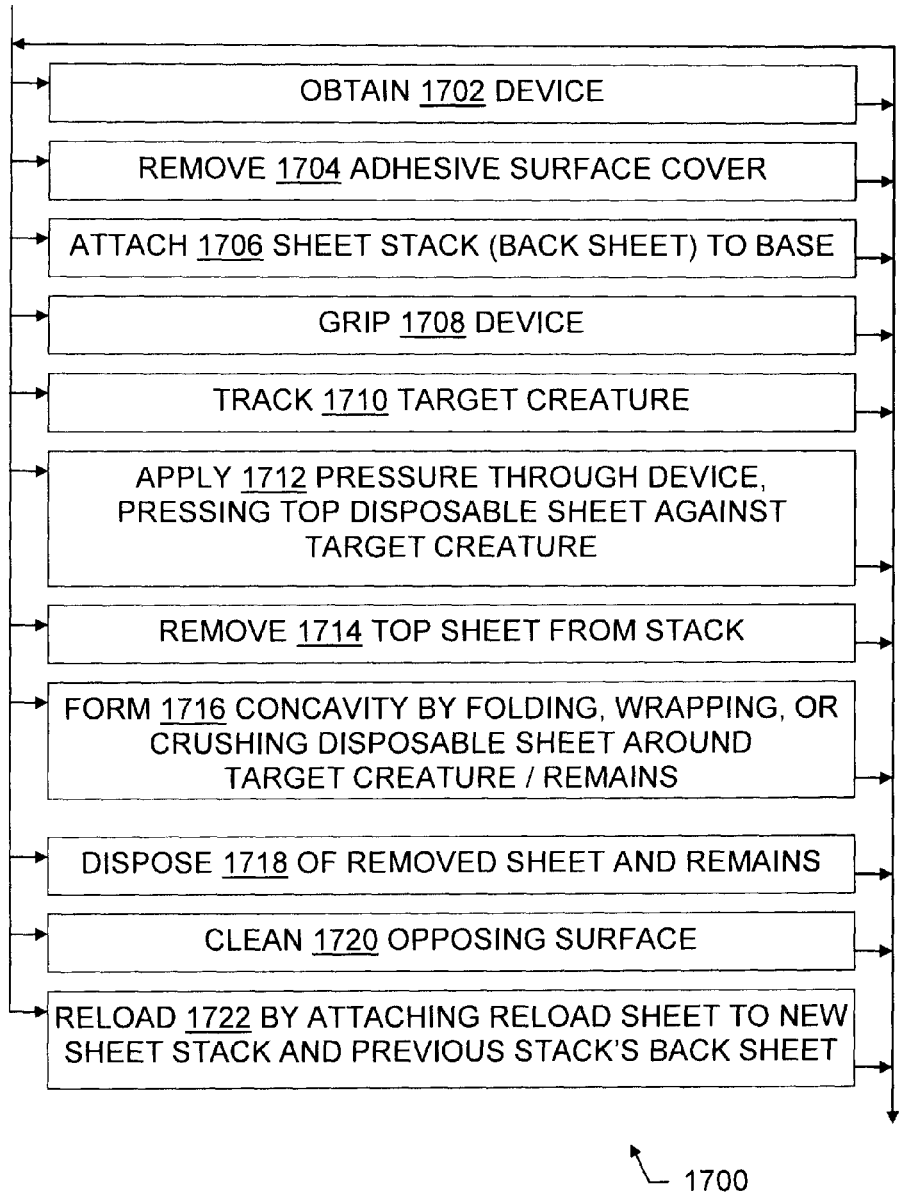
FIG. 17 is a flow chart illustrating steps of some method embodiments.

FIG. 17 illustrates some method embodiments, in a flowchart 1700. In a given embodiment zero or more illustrated steps of a method may be repeated. Steps in an embodiment may also be done in a different order than the top-to-bottom order that is laid out in FIG. 17. Steps may be performed serially, in a partially overlapping manner, or fully in parallel. The order in which a flowchart is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flows, provided that the method performed is operable and conforms to at least one claim. A given method may include steps from either or both of these Figures.

Steps described as being performed by a user may also be performed by another person, or by a machine, on behalf of a user. Another person who performs steps on behalf of a user need not have a particular user in mind.

During an obtaining step 1702, a user obtains a device for kinetic non-adhesive pest control. The device may be in any of the general forms illustrated in FIGS. 1, 5, 9, 10, 11, 12, 13, 14, 15, or 16, for example, or in other stamp, hammer, knuckle duster, glove, swatter, gun, or spear forms, or in any of the other forms disclosed herein. The device is obtained when the user has legal and/or physical control of the device, for example.

During a cover removing step 1704, a user removes a protective cover, e.g., by peeling it off, thereby exposing an adhesive surface. The protective cover may be removed from the base attachment area adhesive surface 110, for example, or from a reload sheet 402.

During a sheet stack attaching step 1706, a user attaches a sheet stack 112 to a base 104. Attaching step 1706 may be performed, for example, by attaching a back sheet 116 of a sheet stack to an adhesive surface 110, by attaching to an adhesive surface 110 a bottom sheet 118 of a sheet stack that lacks a back sheet, by attaching a back sheet 116 to an adhesive surface 110 by way of intervening back sheet(s) and reload sheet(s), or by attaching a bottom sheet 118 of a sheet stack that lacks a back sheet to an adhesive surface 110 by way of zero or more intervening back sheet(s) and zero or more reload sheet(s).

During a device gripping step 1708, a user takes hold of the device, by hand or with a hand tool, in order to aim the device (mathematically, a normal vector of the top sheet of the stack 112) at a target pest. Grips 108 may assist but are not necessarily present, and are not necessarily used if present.

During a tracking step 1710, a user tracks the position of a target pest, e.g., by watching the target's movements.

During a pressure applying step 1712, a user applies pressure through the device, pressing the top sheet of the stack 112 against an opposing surface and also, in a successful impact, against a target pest. Pressure may be applied directly through the user's arm and hand into the handle 102 and thence to the base 104 and the attached top sheet, for example, using devices such as those illustrated in FIGS. 1, 5, 9, 10, 11, 13, 15, and 16 as they are held by the user; gloves may be "held" by virtue of being worn. Pressure may be applied less directly but nonetheless with kinetic force imparted primarily or solely by the user, for example with the swatter device shown in FIG. 12, or by throwing the spear device shown in FIG. 15. Pressure may be applied through the device but without kinetic forces primarily supplied by the user, for example with the fired projectile shown in FIG. 14 which receives kinetic force primarily or solely from the mechanism 1404.

It will be understood that the pressure applied with the device should be sufficient to stun or crush most insects but not so great as to damage a typical sheetrock wall, for example. Knowing the configuration of the device and its intended uses, one of skill can readily determine by experiment appropriate pressures, or the desirability of a particular pressure. Use of the device to apply pressure against old windows, or other fragile and brittle surfaces, is not recommended.

During a sheet removing step 1714, a user removes to top sheet from a stack 112 after that sheet impacts a target creature. Sheets are easily removed by users, because the sheets are held on the stack by low bond adhesive.

During a concavity forming step 1716, a user forms a concavity in the used top sheet to more or less enclose pest remains after impact. The user may fold the top sheet, wrap it, or crumple it, for example, around the remains.

During a disposing step 1718, the user disposes of the used top sheet, e.g., by placing it in a wastebasket, fireplace, or other waste disposal system.

During a surface cleaning step 1720, a user cleans pest remains from the wall, floor, or other opposing surface. Cleaning may be done by wiping the surface with paper towel, toilet tissue, facial tissue, or disposable cleaning cloths, for example. Because the remains generally have little adhesion, and because the top sheet has no adhesive ability, removal of the top sheet from the opposing surface after the impact is easily done, unlike some prior approaches.

During a reloading step 1722, a user reloads the device by attaching a new sheet stack to the device. Reloading may be accomplished using a reload sheet 402 as described above, or by using the low bond adhesive of a bottom sheet of a sheet stack, for example.

Some embodiments provide a method for smashing creatures such as spiders and insects. The method includes obtaining 1702 a device. In some embodiments, the device has the following components: a base 104 having a stack attachment area 106; a handle 102 secured to the base; and a sheet stack 112 including a back sheet and at least one disposable sheet adhered to a top side of the back sheet with a low-bond adhesive and having a note area which is free of adhesive, a bottom side of the back sheet being attached to the base stack attachment area. The method also includes gripping 1708 the device handle, and then applying 1712 pressure with the device to a top disposable sheet of the sheet stack to press the top disposable sheet against a target creature, thereby kinetically stunning, disabling, or killing the target creature. In some embodiments, the method also includes removing 1714 the top disposable sheet from the sheet stack.

In some embodiments, the disposable sheets are disposable paper sheets of a note pad. In some, the method includes forming 1716 a concavity with the top disposable sheet around at least a portion of the target creature, that is, around some or all of the target's remains after impact.

In some embodiments, the method includes disposing 1718 of the removed top disposable sheet together with at least a portion of the target creature.

In some embodiments, the removing step 1714 removes the last disposable sheet of the sheet stack, thereby exposing the back sheet, and the method further includes reloading 1722 the device by attaching a second sheet stack to the exposed back sheet.

Conclusion

Although particular embodiments are expressly illustrated and described herein as methods or as devices, it will be appreciated that discussion of one type of embodiment also generally extends to other embodiment types. For instance, the descriptions of methods in connection with FIG. 17 also help describe the operation of devices like those discussed in connection with FIGS. 1 through 16. It does not follow that limitations from one embodiment are necessarily read into another.

Not every item shown in the Figures need be present in every embodiment. Although some possibilities are illustrated here in text and drawings by specific examples, embodiments may depart from these examples. For instance, specific features of an example may be omitted, renamed, grouped differently, repeated, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A device for smashing spiders and insects, comprising:
a base having a stack attachment area;
a sheet stack which includes a stack of disposable sheets releasably held together by a low bond adhesive, the sheet stack having a top sheet which is the sheet in the sheet stack located furthest from the base stack attachment area when the sheet stack is attached to the stack attachment area, the only adhesive present in the stack being the low bond adhesive which releasably holds the sheets together, each sheet having a note area which is free of adhesive and is designed to receive and retain ink, the sheets being made of a material and stacked with the low bond adhesive such that when the top sheet is pressed against a wall, a floor, or another opposing surface the top sheet does not adhere to the opposing surface;
a handle secured to the base, the handle and base together having a compressive strength and stiffness adequate to withstand an impact force of 5 Newtons against the base stack attachment area without the device permanently changing shape; and
an adhesive surface secured to the base stack attachment area and capable of adhering to a bottom sheet of the stack of disposable sheets.

2. The device of claim 1, wherein the handle and base together are adequate to withstand an impact force of 20 Newtons against the base stack attachment area without the device permanently changing shape.

3. The device of claim 1, wherein the handle and base together are adequate to withstand an impact force of 200 Newtons against the base stack attachment area without the device permanently changing shape.

4. The device of claim 1, wherein the handle and base are connected by structural ribs, thereby reinforcing the base stack attachment area against deformation.

5. The device of claim 1, wherein the handle and the base stack attachment area are portions of a single integral piece of plastic.

6. The device of claim 1, wherein the handle is fully contained within a hull volume defined by all normals to the base stack attachment area.

7. The device of claim 1, wherein the sheet stack includes disposable paper sheets having at least one of the following sheet perimeter shapes: boot, fist, grenade, bomb with fuse, skull, hammer, sword, gun, missile, carnivorous creature, tornado, lightning, or cross.

8. The device of claim 1, wherein the sheet stack includes disposable paper sheets imprinted with at least one of the following images: boot, fist, grenade, bomb with fuse, skull, hammer, sword, gun, missile, carnivorous creature, tornado, lightning, cross, corporate logo, organizational logo, or logo denoting membership in a particular group.

9. The device of claim 1, wherein the sheet stack includes disposable paper sheets in a low bond adhesive note pad.

10. The device of claim 1, further comprising at least one reload sheet, the reload sheet being of a size and shape which is capable of reload sheet placement that satisfies at least one of the following:
no edge-to-edge distance of the reload sheet is more than one hundred and five percent of a corresponding edge-to-edge distance of the stack attachment area;
no edge-to-edge distance of the reload sheet is more than one centimeter greater than a corresponding edge-to-edge distance of the stack attachment area;
no edge-to-edge distance of the reload sheet is less than ninety percent of a corresponding edge-to-edge distance of the sheet stack;
no edge-to-edge distance of the reload sheet is less than one-half centimeter less than a corresponding edge-to-edge distance of the sheet stack.

* * * * *